US007910861B2

(12) United States Patent
Nam et al.

(10) Patent No.: US 7,910,861 B2
(45) Date of Patent: Mar. 22, 2011

(54) COOKING DEVICE

(75) Inventors: Hyeon Sik Nam, Seoul (KR); Wan Soo Kim, Seoul (KR); Dong Seong Kwag, Seoul (KR); Seong Ho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 640 days.

(21) Appl. No.: 11/940,129

(22) Filed: Nov. 14, 2007

(65) Prior Publication Data

US 2008/0128405 A1 Jun. 5, 2008

(30) Foreign Application Priority Data

Nov. 15, 2006 (KR) ........................ 10-2006-0112900

(51) Int. Cl.
*A21B 1/00* (2006.01)
*A47J 27/08* (2006.01)

(52) U.S. Cl. ........ 219/400; 219/414; 219/724; 219/388; 219/391; 219/411; 126/21 A; 126/197; 126/339; 99/337; 99/339; 99/483

(58) Field of Classification Search .......... 219/285–286, 219/388, 391, 393, 400, 411–414, 724, 739; 126/21 A, 197, 339; 99/337, 339, 483
See application file for complete search history.

(56) References Cited

U.S. PATENT DOCUMENTS 6,930,284 B2 * 8/2005 Kang ............................ 219/391

FOREIGN PATENT DOCUMENTS

KR 2005009547 * 1/2005

* cited by examiner

*Primary Examiner* — Shawntina Fuqua
(74) *Attorney, Agent, or Firm* — Birch, Stewart, Kolasch & Birch, LLP

(57) ABSTRACT

A cooking device including a cooking cavity, a fan located in the cooking device, the fan being configured to force air into the cooking cavity, and at least one optical heater to supply optical wave energy to heat the forced air provided by the fan.

22 Claims, 9 Drawing Sheets

COOKING DEVICE

CROSS-REFERENCE TO RELATED APPLICATIONS

This application claims priority to Korean Patent Application No. 10-2006-0112900, filed on Nov. 15, 2006, the entire contents of which are hereby incorporated by reference.

BACKGROUND OF THE INVENTION

1. Field of the Invention

The present invention relates generally to a cooking device that can cook food by using a heat source, and more particularly, to a cooking device that includes at least one optical heater to heat forced air provided by a fan.

2. Description of Related Art

A related art cooking device is generally used for cooking food or heating objects placed in the cooking device by supplying heat from a heat source to the food or other objects placed in the cooking device. For example, the cooking device may defrost, warm, and/or sterilize food placed in a cooking cavity of the cooking device. In addition, the cooking device may also be used to heat and/or sterilize steam towels. The related art cooking device employs various kinds of heat sources so as to implement optimum cooking methods corresponding to a variety of cooking conditions, such as the type of food or object, the type of cooking method, and the type of cooking device.

It is required that the heat sources for the cooking device be used to cook food or heat objects placed therein, quickly and uniformly to satisfy quick response time desired by a user. It is desirable that the heat source of the cooking device should also have low manufacturing and maintenance cost, stability, ease of maintenance and control, and high durability.

BRIEF SUMMARY OF THE INVENTION

The present invention addresses one or more of the above problems, and provides a cooking device, which can be used to visually determine whether an optical heater is operating based on light radiated from the optical heater. The optical heater provides light wave energy so that the temperature within a cooking cavity can be raised.

According to an aspect of the present invention, there is provided a cooking device that includes a cooking cavity, a fan located in the cooking device, the fan being configured to force air into the cooking cavity, and at least one optical heater to supply optical wave energy to heat the forced air provided by the fan.

In another aspect, the cooking device may include a heating chamber configured to communicate with the cooking cavity, the fan being located in the heating chamber.

In a further aspect, the at least one optical heater may be located in the heating chamber.

In still another aspect, the cooking device may include a reflector located in the heating chamber, the reflector being configured to reflect light of the at least one optical heater.

In yet another aspect, the at least one optical heater may be configured to surround at least a portion of the periphery of the fan.

In a different aspect, the at least one optical heater may be located in a flow channel of the forced air.

In still another aspect, the cooking cavity may include at least one protruding portion that extends towards the heating chamber. The at least one optical heater may include a pair of ends, the pair of ends being received in the at least one protruding portion.

In another aspect, the at least one protruding portion may include a first protruding portion, and a second protruding portion spaced opposite the first protruding portion. The at least one optical heater may include a first optical heater having one end located in the first protruding portion and the other end located in the second protruding portion and a second optical heater having one end located in the first protruding portion and the other end located in the second protruding portion.

In a different aspect, the cooking device may include a cover member, the heating chamber being defined by the cover member and a rear surface of the cooking cavity.

In another aspect, the at least one optical heater may be in the form of a rod.

In still another aspect, the at least one optical heater may include a main body and a plurality of projections that extend from the main body. Alternatively, the at least one optical heater may include at least one concave surface and at least one convex surface.

In a different aspect, the at least one optical heater may be one of a carbon heater and a halogen heater.

According to principles of the present invention, there is provided a cooking device that includes a cooking cavity, a fan located in the cooking device, the fan being configured to force air into the cooking cavity, and at least one carbon heater to supply optical wave energy to heat the forced air provided by the fan.

Additional aspects are similar to those described above.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

The present invention will now be described in detail in connection with exemplary embodiments of cooking devices shown in the accompanying drawings. It is to be noted that a cooking device according to the present invention can be implemented through many different embodiments, some of which will now be described.

A first exemplary embodiment of a cooking device according to the present invention is shown in FIGS. 1-4. The cooking device includes a cabinet 2, a cooking cavity 4 provided within the cabinet 2, a door 6 for opening and closing the cooking cavity 4, a control PCB (not shown) disposed in either the cabinet 2 or the door 4, and a heat source supply unit for supplying heat to food or other objects placed in the cooking cavity 4. The cooking cavity 4 has a front surface, which includes an opening to provide access to the cooking cavity 4, opposite the door 6, so that the front surface opening can be opened and closed by the door 6 and food or other objects can be placed in and removed from the cooking cavity 4. While it has been noted above that food and other objects can be heated in the cooking device, all future description will relate to food being placed in the cooking device.

Figure 1:
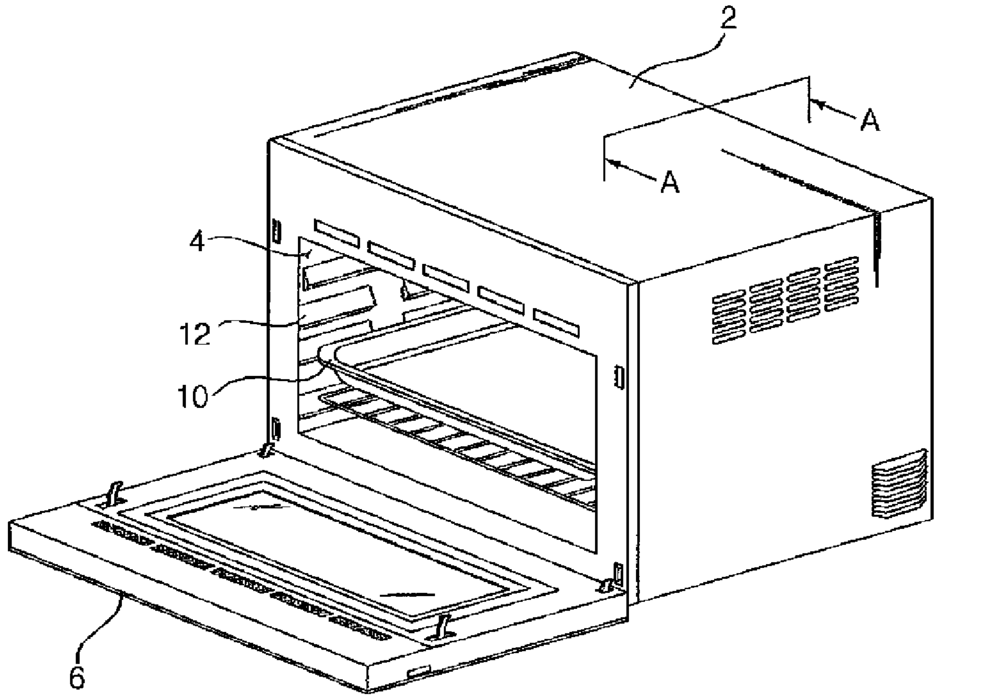
FIG. 1 is a perspective view of a cooking device according to a first embodiment of the present invention when a door of the cooling device is opened.
Figure 2:
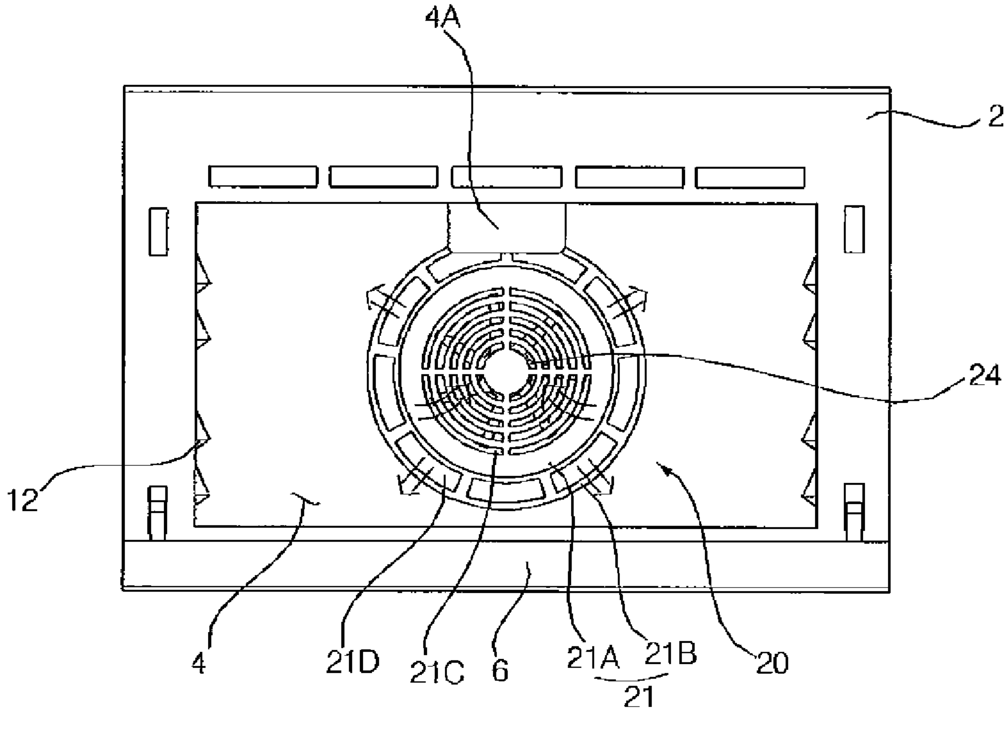
FIG. 2 is a front view of the cooking device of FIG. 1.
Figure 3:
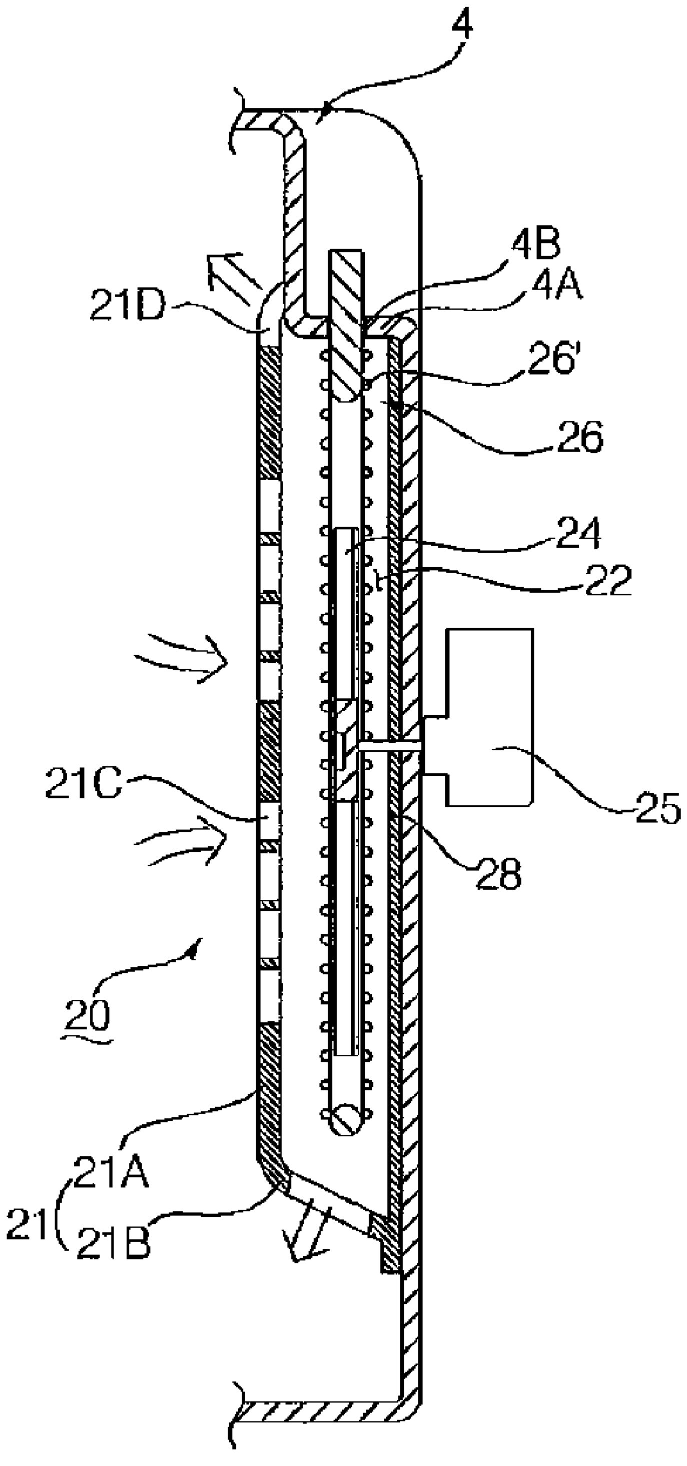
FIG. 3 is a cross-sectional view of the cooking device taken along line A-A of FIG. 1.
Figure 4:
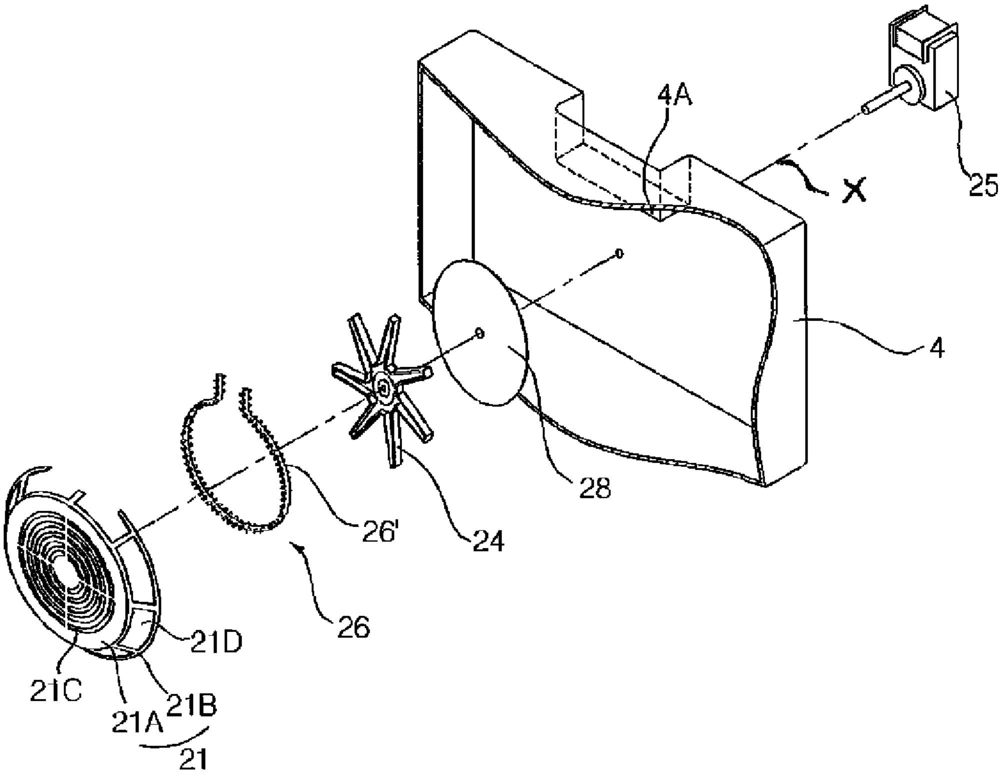
FIG. 4 is an exploded perspective view of the beating components of the cooking device of FIG. 1.

As shown in FIGS. 2-4, the cooking cavity 4 can have a protruding portion 4A that extends towards a heating chamber or convection chamber 22, which will be described in detail below. As shown in the figures, the protruding portion 4A of the cooking cavity 4 is formed integrally with the cooking cavity 4. In particular, when viewed from the outside of the cooking cavity 4, a portion of a rear wall of the cooking cavity corresponding to the protruding portion 4A of the cooking cavity 4 extends towards the inside of the cooking cavity 4. By providing the protruding portion 4A integrally with the cooking cavity 4, additional processes and components for fabricating the protruding portion 4A of the cooking cavity 4 and assembling the protruding portion 4A and the cooking cavity 4 can be obviated. Further, since electrical components for controlling the cooking cavity 4 can be located in the protruding portion 4A, the utilization of space can be increased.

At least one hole 4B is formed in protruding portion 4A and is configured to receive an end of an optical heater 26 disposed in the convection chamber 22 so that the end of the optical heater 26 passes through the protruding portion 4A of the cooking cavity 4. In this exemplary embodiment, one protruding portion 4A and two through holes 4B are disposed on one side of the cooking cavity 4 in order for both ends of the optical heater 26 to pass therethrough. Accordingly, the optical heater 26 can be easily connected to a control PCB (not shown) located outside the cooking cavity 4 without being bent.

While the cooking device has been described as having a protruding portion 4A, the present invention is not limited to the above configurations as the protruding portion 4A can be eliminated and the ends of the optical heater can extend through some other portion of the cooking cavity 4. In addition, the present invention can be implemented in various ways, such as that the protruding portion 4A is formed separately from the cooking cavity 4 and then coupled to the cooking cavity 4 using various connection techniques.

A rack 10, which supports food placed in the cooking cavity 4, can be disposed within the cooking cavity 4. Rack rails 12, which allow the edges of the rack 10 to be inserted or removed so that the rack 10 can be attached to or detached from the cooking cavity 4, are disposed on the left and right inner walls of the cooking cavity 4. A plurality of the rack rails 12 can be disposed in a vertical direction on the left and right inner walls of the cooking cavity 4, respectively, so that the position of the rack 10 within the cooking cavity 4 can be moved upward and downward.

The cooking cavity heat source supply unit can be constructed to supply one or more of various kinds of heat sources, including heaters and microwaves. In particular, the heat source supply unit includes a convection module 20 for supplying heat from a heater in a forced convection manner. The convection module 20 includes the convection chamber 22 in communication with the cooking cavity 4, a fan 24 for generating forced convection between the convection chamber 22 and the cooking cavity 4, and an optical heater 26 disposed in the convection chamber 22 and configured to supply heat to the forced convection generated by the fan 24. The optical heater 26 can be one of many heaters that radiate energy in the form of light, such as a halogen heater and a carbon heater. Further details of the optical heater 26 will be provided below.

The convection chamber 22 can be coupled directly to the cooking cavity 4 or can communicate with the cooking cavity 4 through an additional convection duct, which is spaced apart from the cooking cavity 4 and guides the forced convection generated by the fan 24. In this first exemplary embodiment, the convection chamber 22 is directly coupled to the cooking cavity 4 and is defined by a rear wall of the cooking cavity 4 and a convection cover 21. The convection chamber 22 is provided inside the cooking cavity 4, as shown in the figures, or outside the cooking cavity 4.

In particular, the convection cover 21 is coupled to one side of the inner wall of the cooking cavity 4 to define the convection chamber 22. The convection cover 21 includes a base panel 21A and a barrier panel 21B. The base panel 21A protrudes from the inner walls of the cooking cavity 4 towards the center of the cooking cavity 4. The barrier panel 21B extends from the base panel 21A and surrounds a gap between the base panel 21A and the inner walls of the cooking cavity 4. In the present embodiment, the base panel 21A has a round shape; however, the present invention is not limited to such a configuration and the base panel 21A can have a variety of shapes such as a square or an ellipse. Further, in the present embodiment, the base panel 21A has a flat surface; however, the present invention is not limited to such a configuration and base panel 21A can have different shaped surfaces such as convex/concave surfaces.

The sectional area of the convection chamber 22 is gradually narrowed as the barrier panel 21B goes from the inner walls of the cooking cavity 4 to the base panel 21A. Thus, the barrier panel 21B includes an inclined surface in which the inner walls of the cooking cavity 4 are spaced apart from the base panel 21A. As shown in FIG. 3, a convection exhaust vent 21D may be formed in the inclined surface to direct hot air from the convection chamber 22 towards the center of the cooking cavity 4. Thus, hot air generated by the convection module 20 can be concentrated on food placed in the center of the cooking cavity 4.

Convection intake vents 21C, as shown in FIGS. 2-4, are provided in the front of the convection cover 21 so that the forced convection generated by the fan 24 causes air to flow from the cooking cavity 4 to the convection chamber 22. The convection intake vents 21C are disposed centrifugally so that the fan 24 can rotate around axis X, best seen in FIG. 4, to draw air in through the convection intake vents 21C. The convection exhaust vents 21D are formed in the convection cover so that the forced convection generated by the fan 24 can move from the convection chamber 22 to the cooking cavity 4. The convection exhaust vents 21D are of a centrifugal type, and can be disposed in the barrier panel 21B in order to prevent mixing with the forced convection through the convection intake vents 21C. A plurality of the convection exhaust vents 21D can be disposed in the barrier panel 21B so that the force convection by the fan 24 can be spread from the convection chamber 22 to the cooking cavity 4 quickly and uniformly.

While the first exemplary embodiment has been described with a fan 24 having a centrifugal form so that the forced convection can be formed from the convection intake vents 21C to the convection exhaust vents 21D, the present invention is not so limited. Rather, the fan 24 can be implemented in various ways such as an axial current type or a cross current type.

The fan 24 is rotated by a motor 25 driven by electricity. The motor 25 can also be disposed within or outside the convection chamber 22. Further, the motor 25 can be directly connected to the fan 24 via an axis or indirectly connected thereto via a belt and pulley, a gear module of the like.

At least one optical heater 26 is disposed on the flow channel of the forced convection generated by the fan 24. That is, one or more optical heaters 26 can be disposed in the convection chamber 22 or can be disposed on an additional duct that connects the convection chamber 22 aid the cooking cavity 4. As shown in the figures, the optical heater 26 is disposed in the convection chamber 22. When the optical heater 26 is disposed in the convection chamber 22, it can be disposed between the fan 24 and the base panel 21A or between the fan 24 and the barrier panel 21B, as shown in FIGS. 3 and 4. The optical heater 26 can surround at least part of the fan 24. That is, the optical heater 26 can be provided in a ring shape or can be implemented in various forms, such as a bar shape, an L shape, a H shape, a V shape, a spiral shape or a horseshoe shape.

The optical heater 26 can have one or more projections to provide a wide surface area relative to the size of the optical heater 26. For example, in this first exemplary embodiment, the optical heater 26 includes a plurality of pins 26' that protrude from the surface of the optical heater 26. The pins 26' can be formed separately and then combined with the optical heater 26 or formed integrally with a body of the optical heater 26. Alternatively, the optical heater 26 can have a convex/concave pattern formed thereon in order to increase the surface area of the optical heater 26. In other words, a plurality of grooves can be formed in the surface of the optical heater 26. By providing a large surface area, heat exchange with the forced convection by the optical heater 26 and the fan 24 can be increased relative to the size of the optical heater 26. Accordingly, heating efficiency can be improved.

The convection module 20 can also include a reflector 28 capable of reflecting light from the optical heater 26. The reflector 28 can be located between the inner walls of the cooking cavity 4 defining the convection chamber 22 and the optical heater 26 so that the light of the optical heater 26 can be reflected from the convection chamber 22 towards the cooking cavity 4. The reflector 28 can be attached to the inner walls of the cooking cavity 4 constituting the convection chamber 22 so as to reduce heat loss of the convection module 20 through the inner walls of the cooking cavity 4. Alternatively, the reflector 28 can be attached to part of the inner walls of the cooking cavity 4 defining the convection chamber 22 corresponding to the size of the optical heater 26, or can be attached to the entire inner walls of the cooking cavity 4 defining the convection chamber 22. While the first exemplary embodiment shows only one reflector 28, two or more reflectors 28 can be provided on the inner walls of the cooking cavity defining the convection chamber 22. The reflector 28 can have a flat surface or can have at least one convex/concave portion formed therein.

Figure 5:
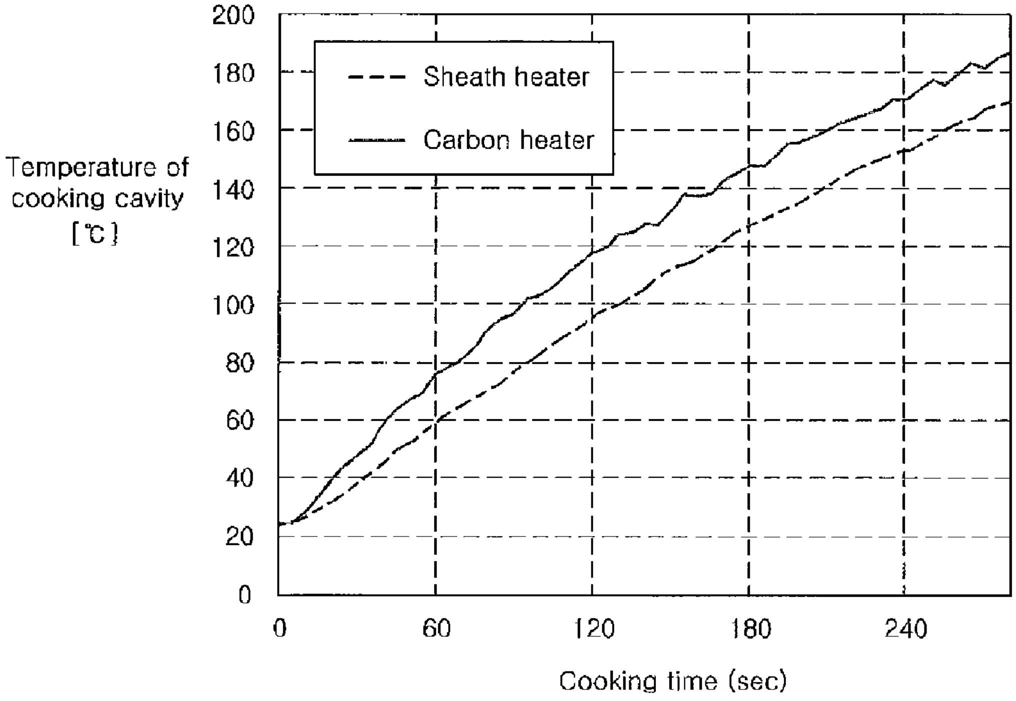
FIG. 5 is a graph showing the relationship between temperatures within a cooking cavity and the operating time of a carbon heater and a sheath heater.

The optical heater 26 supplies heat by light wave energy and has a low heat capacity. Thus, it is easy to visually determine whether the optical heater 26 is operating based on the light generated from the optical heater 26. Further, because of the low heat capacity, a temperature within the cooking cavity 4 can be raised rapidly. A sheath heater of a conventional cooking device, on the other hand, has a much larger heat capacity and is quickly cooled by the forced convection generated by the fan 24. Because the sheath heater does not use light to generate heat, it is difficult to visually determine whether a sheath heater is operating. Furthermore, as shown in FIG. 5, the optical heater in the form of a carbon heater, heats the air in the cooking cavity to a higher temperature and at a faster rate than the sheath heater can heat the air in the cooking cavity. This comparison was made by operating both the carbon heater and the sheath heater at the same power lever, in particular, 2000 watts.

Figure 6:
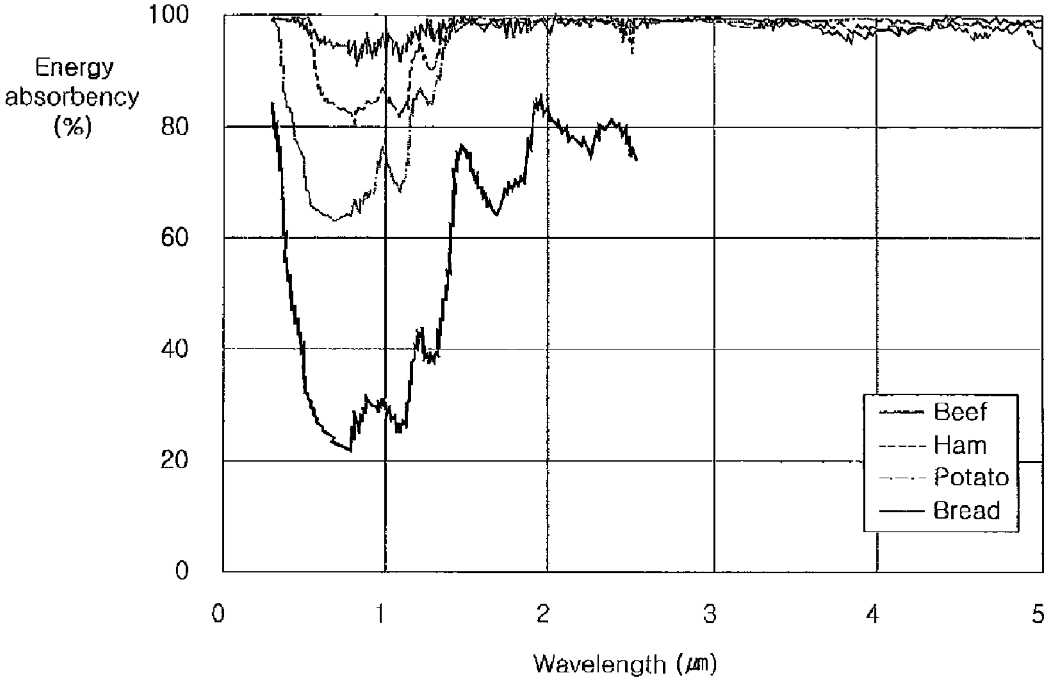
FIG. 6 is a graph showing the relationship between energy absorption factors and wavelengths depending on the foods placed in the cooking device.
Figure 7:
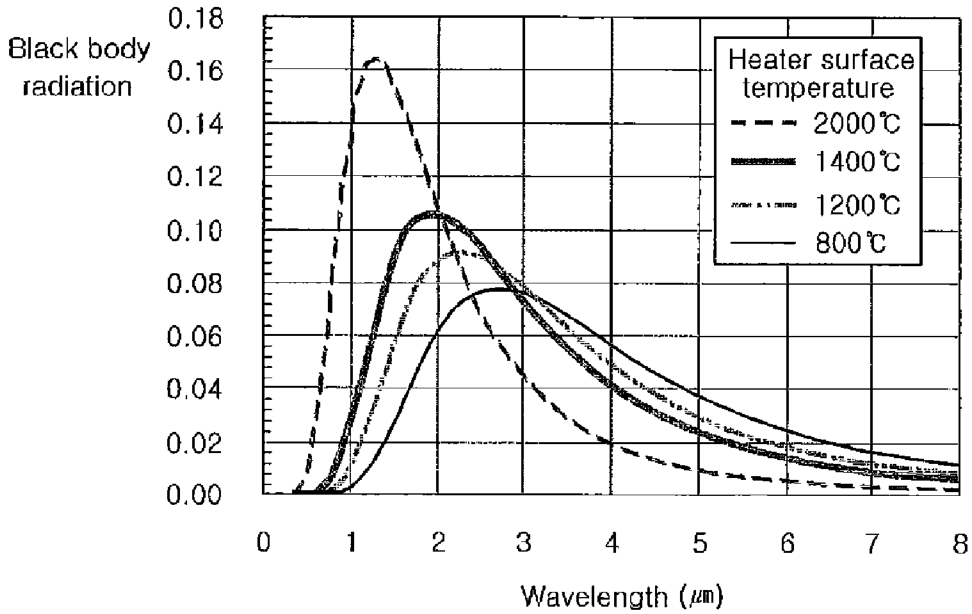
FIG. 7 is a graph showing the relationship between black body radiation spectra and wavelengths depending on temperatures.
Figure 8:
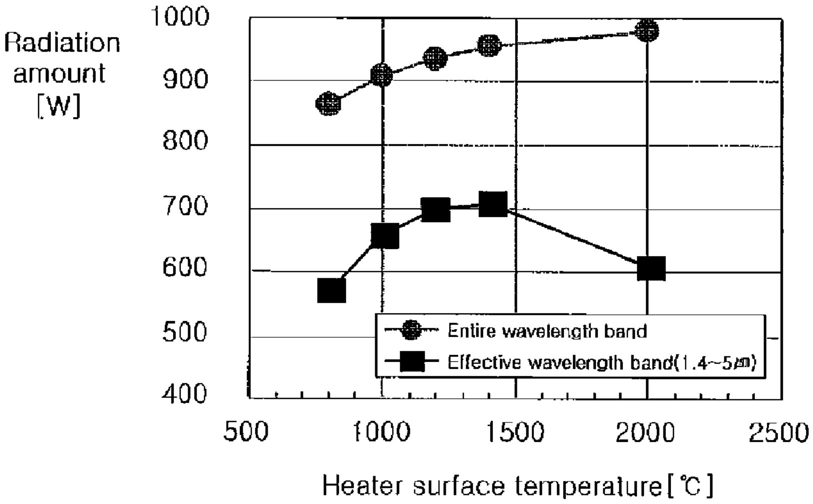
FIG. 8 is a graph showing the relationship between the amount of radiation and surface temperatures of the heater depending on wavelengths.
Figure 9:
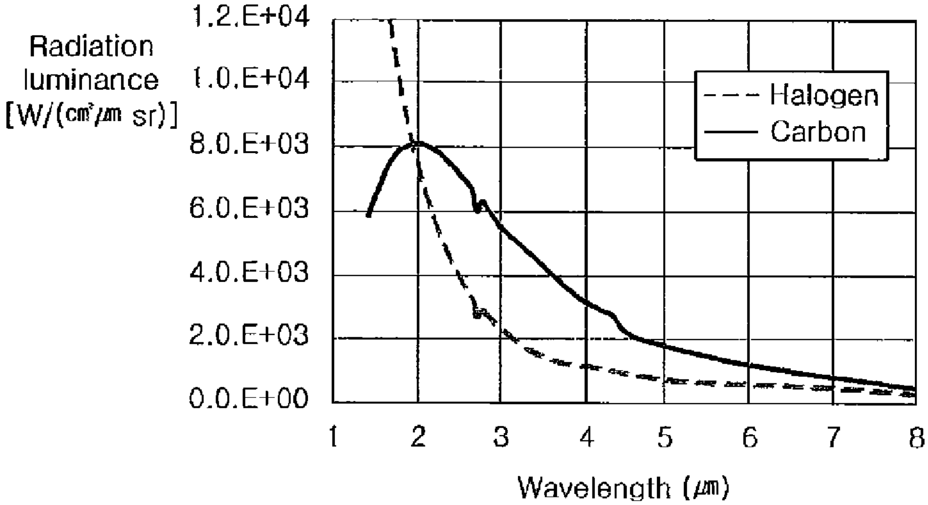
FIG. 9 is a graph showing the relationship between radiation luminance and wavelengths of a carbon heater and a halogen heater.

Next, various characteristics of the respective heaters will be described with reference to FIGS. 6 to 9. FIG. 6 is a graph showing the relationship between energy absorption factors and wavelengths depending on various foods placed in the cooking device. As a result of an experiment on various foods including steak, ham, potatoes, and bread, it was determined that the wavelengths of approximately 1.4 to 5 μm were effective wavelength bands for which the energy absorption factors of the various foods were good. FIG. 7 is a graph showing the relationship between black body radiation spectra and wavelengths depending on temperatures and FIG. 8 is a graph showing the relationship between the amount of radiation and surface temperatures of the heater depending on wavelengths. From FIGS. 7 and 8, it is apparent that a heater that provides a lot of radiation when operated at the effective wavelength bands of 1.4 to 5 μm of the various foods and provides a heater surface temperature of approximately 1200 to 1400° C. is advantageous. Finally, FIG. 9 is a graph showing the relationship between radiation luminance and wavelengths depending on a carbon heater and a halogen heater. From FIG. 9, it can be seen that the carbon heater, at the effective wavelength bands (approximately 1.4 to 5 μm) of the various foods tested, has a greater radiation amount than the halogen heater has at the same wavelength bands.

The following table 1 shows surface temperatures of respective heaters based on the various foods tested, an increase in the temperature of the various foods tested, and power consumption cost.

TABLE 1

| | | | halogen | ceramics | sheath | Radiant | Carbon |
|---|---|---|---|---|---|---|---|
| Heat surface temperature (° C.) | | | 2,000 | 1,000 | 900 | 900 | 1200 |
| Temperature increase (Δ t ° C.), 1200 W | Cooking object (cooking time) | Steak (15 minutes) | 31.6 | 24.2 | 23.1 | | 26.7 |
| | | Ham (10 minutes) | 27.5 | 24.9 | 23.6 | | 30.4 |
| | | Potato (15 minutes) | 37.0 | 34.8 | 29.2 | | 44.0 |
| | | Bread (4 minutes) | 8.1 | 22.8 | 5.1 | | 26.3 |
| Power consumption cost (V1 kW) | | | 8500 | | | | 8000 |

Referring to FIGS. 6 to 9 and Table 1, the optical heater 26 has a surface temperature that produces a higher radiation amount at the effective wavelength bands of the various foods tested as compared to the sheath heater. In addition, the optical heater has a relatively better effective radiation energy amount and a quicker cooking speed compared with the sheath heater. In addition, the carbon heater of the optical heaters 26 has a surface temperature that produces a higher radiation amount at the effective wavelength bands of the various foods than the halogen heater does, and thus, has a relatively more effective radiation energy amount and a faster temperature increase rate compared with the halogen heater, enabling more rapid cooking and low power consumption cost. Thus, it can be more advantageous to use carbon rather than halogen as the optical heater 26; however, both the halogen heater and the carbon heater are more advantageous than the sheath heater.

An operation of the convection module 20 of the cooking device of this first embodiment will be described below. When the convection module 20 operates, power is supplied to the motor 25 to rotate the fan 24. Power is applied to the optical heater 26, so that the optical heater 26 produces light. Thus, when forced convection is formed between the cooking cavity 4 and the convection chamber 22 by the fan 24, the forced convection is heated under the influence of light wave energy from the optical heater 26. As a result, the temperature within the cooking cavity 4 is raised and food within the cooking cavity 4 is heated.

Figure 10:
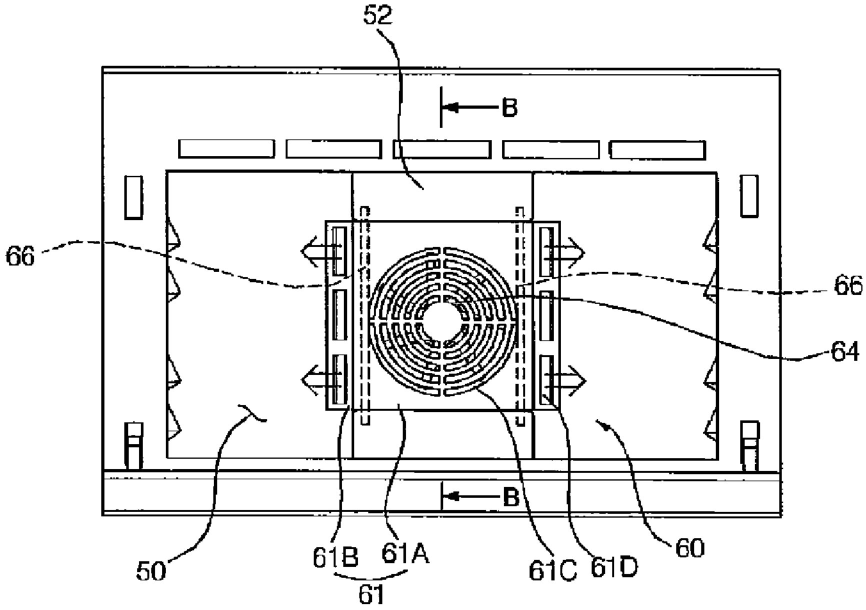
FIG. 10 is a front view of a cooking device according to a second embodiment of the present invention.
Figure 11:
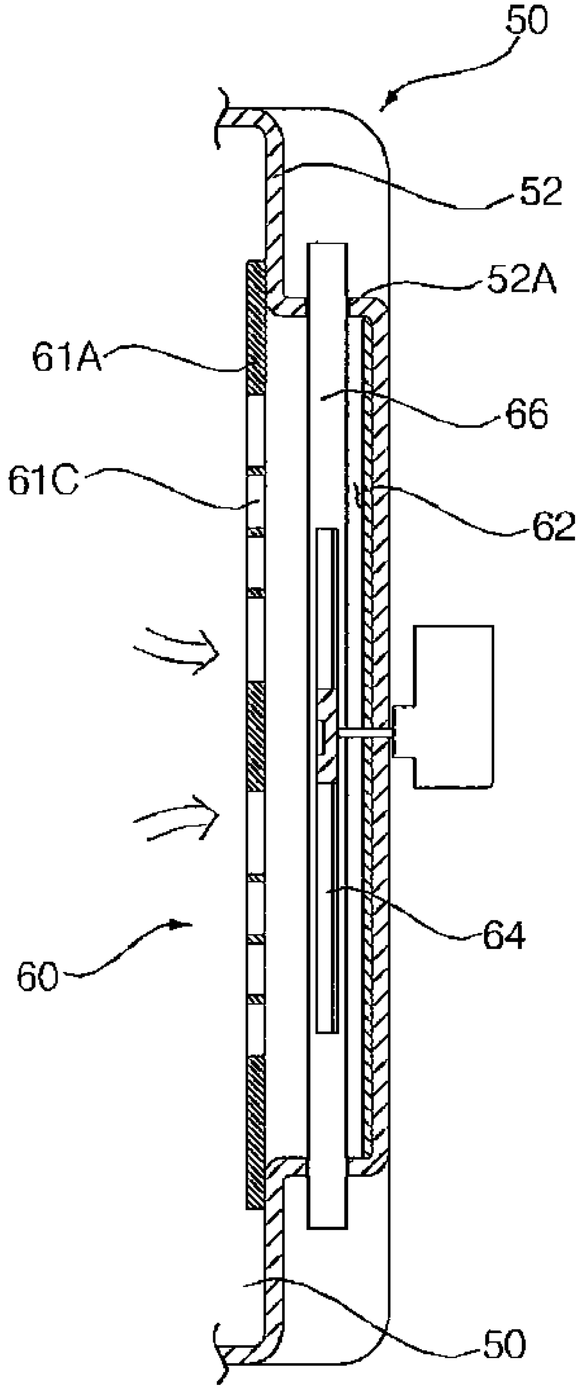
FIG. 11 is a cross-sectional view of the cooking device taken along line B-B of FIG. 10.
Figure 12:
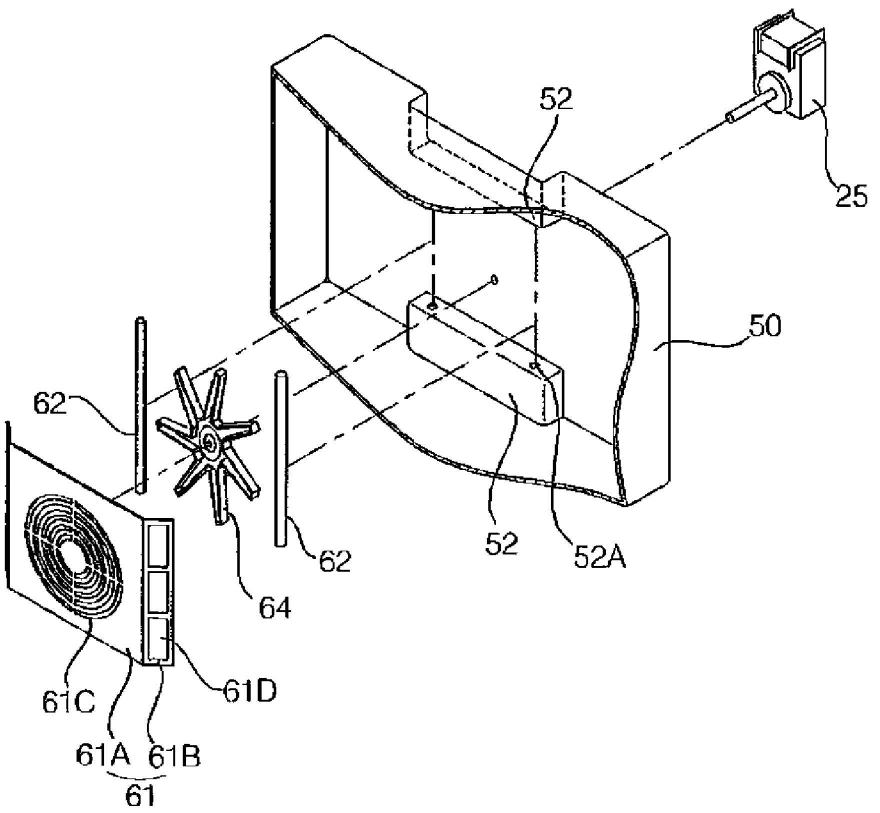
FIG. 12 is an exploded perspective view of the heating components of the cooking device of FIG. 10.

A second exemplary embodiment of the cooking device according to the present invention is shown in FIGS. 10-12. With the exception of the features of the convection module, the remaining constituent elements and operation of the cooking device according to the present embodiment can be implemented in the same manner as the cooking device according to the first embodiment of the present invention, and repetitive descriptions will be omitted.

A convection module 60 of the cooking device according to the present embodiment includes a convection chamber 62 defined by a cooking cavity 50 and a convection cover 61, a fan 64 rotated by a motor 63 within the convection chamber 62, and a pair of bar shaped optical heaters 66 located within the convection chamber 62.

A protruding portion 52 protruding toward the inner walls of the cooking cavity 50 can be disposed in the convection chamber 62. The protruding portion 52 can correspond to a portion where the optical heater 66 is not located. In particular, a plurality of protruding portions 52 can be formed in order to allow opposite ends of the optical heater 66 to pass therethrough. That is, two protruding portions 52 can be disposed at the upper and lower sides of the convection chamber 62, respectively. Through holes 52A through which the optical heater 66 can pass are formed in the protruding portions 52.

Convection intake vents 61C are formed in a base panel 61A of the convection cover 61. Convection exhaust vents 61D are formed in the barrier panel 61B and are aligned with the optical heaters 66.

While two optical heaters 66 are shown in the present embodiment, one or more optical heaters 66 can be disposed in the convection chamber 62. The two optical heaters 66 can both be located at one side with respect to the fan 64, or can be spaced apart from each other around the fan 64, as shown in the figures. When the two optical heaters 66 are located opposite each other with respect to the fan 64, hot air generated by the convection module 60 can be supplied uniformly to the cooking cavity 50. As noted above, the optical heaters 66 can correspond to portions where the protruding portions 52 are not located along the circumferential direction of the fan 64. Thus, the protruding portions 52 may serve as part of the boundary of the convection chamber 62, guide the hot air by the convection module 60 to face the convection exhaust vents 61D, and support the optical heaters 66.

The present invention is not limited to the above embodiments, and various other changes and modifications are possible within the spirit and scope of the invention by those having ordinary skill in the art. For example, it is possible to combine the carbon heater and the halogen heater as the optical heater and selectively operate one of them depending on cooking needs. In addition, other heat sources such as other heaters and microwave sources can be added to provide additional heating functions.

As described above in detail, the cooking device according to the present invention employs an optical heater for supplying heat from optical wave energy. It is therefore possible to easily visually determine whether the optical heater is being operated. Further, reliability and efficiency can be improved since a temperature within a cooking cavity can be raised quickly by optical wave energy of the optical heater. Further, if the cooking device includes an optical heater having a convex/concave surface or protruding portions projecting from its surface, light wave energy from the optical heater can be transferred more easily. Accordingly, heat efficiency can be improved.

If the cooking device includes a reflector for reflecting light of the optical heater toward the cooking cavity, heat loss of the optical heater through the walls of the cooking cavity can be reduced, heat efficiency can be improved, and the cooking time can be shortened. Accordingly, the performance of the cooking device can be improved and the visibility of the cooking device can be enhanced by the reflector.

In addition, when the cooking cavity includes protruding portions extending towards the convection chamber, the optical heater can be easily connected to a circuit portion of the control PCB outside of the cooking cavity and the optical heater can be firmly supported by the protruding portions of the cooking cavity. Further, the protruding portions of the cooking cavity can serve to guide forced convection generated by the fan.

Furthermore, when the cooking device employs a carbon heater, good cooking characteristics can be obtained even when compared with other optical heaters, such as a halogen heater.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A cooking device, comprising:

a cooking cavity;

a fan located in the cooking device, the fan being configured to force air into the cooking cavity;

at least one optical heater to supply optical wave energy to heat the forced air provided by the fan; and a heating chamber configured to communicate with the cooking cavity, the fan being located in the heating chamber, wherein the cooking cavity includes at least one protruding portion that extends towards the heating chamber, the at least one protruding portion being provided integral with the cooking cavity, and wherein the at least one optical heater includes a pair of ends, the pair of ends being received in the at least one protruding portion.

2. The cooking device of claim 1, wherein the at least one optical heater is located in the heating chamber.

3. The cooking device of claim 2, further comprising a reflector located in the heating chamber, the reflector being configured to reflect light of the at least one optical heater.

4. The cooking device of claim 2, wherein the at least one optical heater is configured to surround at least a portion of the periphery of the fan.

5. The cooking device of claim 1, wherein the at least one optical heater is located in a flow channel of the forced air.

6. A cooking device, comprising:

a cooking cavity;

a fan located in the cooking device, the fan being configured to force air into the cooking cavity;

at least one optical heater to supply optical wave energy to heat the forced air provided by the fan; and a heating chamber configured to communicate with the cooking cavity, the fan being located in the heating chamber, wherein the cooking cavity includes at least one protruding portion that extends towards the heating chamber, the at least one protruding portion including:

a first protruding portion; and a second protruding portion spaced opposite the first protruding portion; and wherein the at least one optical heater includes:

a first optical heater having one end located in the first protruding portion and the other end located in the second protruding portion; and a second optical heater having one end located in the first protruding portion and the other end located in the second protruding portion.

7. The cooking device of claim 1, further comprising a cover member, the heating chamber being defined by the cover member and a rear surface of the cooking cavity.

8. The cooking device of claim 1, wherein the at least one optical heater is in the form of a rod.

9. A cooking device, comprising:

a cooking cavity;

a fan located in the cooking device, the fan being configured to force air into the cooking cavity; and at least one optical heater to supply optical wave energy to heat the forced air provided by the fan, wherein the at least one optical heater includes a main body and a plurality of projections that extend from the main body.

10. The cooking device of claim 1, wherein the at least one optical heater includes at least one concave surface and at least one convex surface.

11. The cooking device of claim 1, wherein the at least one optical heater is one of a carbon heater and a halogen heater.

12. The cooking device of claim 1, wherein the optical heater is constructed to surround at least part of the periphery of the fan.

13. The cooking device of claim 1, wherein the at least one optical heater is disposed on a flow channel of the forced convection generated by the fan.

14. A cooking device, comprising:

a cooking cavity;

a fan located in the cooking device, the fan being configured to force air into the cooking cavity; and at least one carbon heater to supply optical wave energy to heat the forced air provided by the fan.

15. The cooking device of claim 14, further comprising a heating chamber configured to communicate with the cooking cavity, the fan being located in the heating chamber.

16. The cooking device of claim 15, wherein the at least one carbon heater is located in the heating chamber.

17. The cooking device of claim 16, further comprising a reflector located in the heating chamber, the reflector being configured to reflect light of the at least one carbon heater.

18. The cooking device of claim 16, wherein the at least one carbon heater is configured to surround at least a portion of the periphery of the fan.

19. The cooking device of claim 15, wherein the cooking cavity includes at least one protruding portion that extends towards the heating chamber.

20. The cooking device of claim 19, wherein the at least one carbon heater includes a pair of ends, the pair of ends being received in the at least one protruding portion.

21. The cooking device of claim 19, wherein the at least one protruding portion includes:

a first protruding portion; and a second protruding portion spaced opposite the first protruding portion; and the at least one carbon heater includes:

a first carbon heater having one end located in the first protruding portion and the other end located in the second protruding portion; and a second carbon heater having one end located in the first protruding portion and the other end located in the second protruding portion.

22. The cooking device of claim 15, further comprising a cover member, the heating chamber being defined by the cover member and a rear surface of the cooking cavity.

* * * * *